(12) United States Patent
Chester et al.

(10) Patent No.: US 11,136,699 B2
(45) Date of Patent: Oct. 5, 2021

(54) COMPOSITE SHEET MATERIAL, SYSTEM, AND METHOD OF PREPARING SAME

(71) Applicant: Fitesa Simpsonville, Inc., Simpsonville, SC (US)

(72) Inventors: Stephen O. Chester, Simpsonville, SC (US); Ricardo Basso Fasolo, Greer, SC (US); James Lawson Gary, West Point, GA (US)

(73) Assignee: FITESA SIMPSONVILLE, INC., Simpsonville, SC (US)

( * ) Notice: Subject to any disclaimer, the term of this patent is extended or adjusted under 35 U.S.C. 154(b) by 61 days.

(21) Appl. No.: 16/407,285

(22) Filed: May 9, 2019

(65) Prior Publication Data
US 2019/0345655 A1    Nov. 14, 2019

Related U.S. Application Data

(60) Provisional application No. 62/670,911, filed on May 14, 2018.

(51) Int. Cl.
*D04H 1/72*    (2012.01)
*B32B 5/02*    (2006.01)
(Continued)

(52) U.S. Cl.
CPC .............. *D04H 1/72* (2013.01); *B32B 5/022* (2013.01); *B32B 5/26* (2013.01); *B32B 37/24* (2013.01);
(Continued)

(58) Field of Classification Search
CPC ........ B32B 2262/062; B32B 2037/243; B32B 5/26; B32B 5/022; B32B 37/24;
(Continued)

(56) References Cited

U.S. PATENT DOCUMENTS

| | | |
|---|---|---|
| 3,145,425 A | 8/1964 | Varga |
| 3,338,992 A | 8/1967 | Kinney |

(Continued)

FOREIGN PATENT DOCUMENTS

| | | |
|---|---|---|
| AT | 336611 T | 9/2006 |
| AU | 4932000 A | 1/2001 |

(Continued)

OTHER PUBLICATIONS

International Search Report for Application No. PCT/US2019/032011, dated Sep. 9, 2019.

(Continued)

*Primary Examiner* — Vishal I Patel
(74) *Attorney, Agent, or Firm* — Rimon, P.C.

(57) ABSTRACT

A system and associated method for preparing a composite sheet material is provided. The system includes a nonwoven fabric source; a collection surface onto which a nonwoven fabric is deposited; a carding device disposed downstream of the nonwoven fabric source overlying the collection surface, the carding device including a main cylinder, an air source configured to provide a stream of air; an air manifold having an air inlet in communication with the air source, an air outlet, a fiber inlet, an interior channel, and a fiber outlet. The air outlet is positioned to direct an air stream against a surface the cylinder to dislodge fibers from the surface of the cylinder. The dislodged fibers enter the fiber inlet and flow to the fiber outlet at which point the fibers are deposited onto a surface of the nonwoven fabric. The fabrics are then bonded to form a coherent sheet material.

15 Claims, 6 Drawing Sheets

(51) Int. Cl.
  *B32B 5/26* (2006.01)
  *B32B 37/24* (2006.01)
  *D04H 3/03* (2012.01)

(52) U.S. Cl.
  CPC .......... *D04H 3/03* (2013.01); *B32B 2037/243* (2013.01); *B32B 2262/062* (2013.01); *D10B 2201/02* (2013.01)

(58) Field of Classification Search
  CPC ...... D10B 2201/02; D04H 5/03; D04H 1/498; D04H 3/03; D04H 1/72; D04H 1/492; D04H 3/14
  See application file for complete search history.

(56) References Cited

U.S. PATENT DOCUMENTS

| | | | |
|---|---|---|---|
| 3,692,613 A | | 9/1972 | Pederson |
| 3,777,231 A | * | 12/1973 | Guschin .............. D01G 15/46 361/213 |
| 3,802,817 A | | 4/1974 | Matsuki et al. |
| 3,849,241 A | | 11/1974 | Butin et al. |
| 4,405,297 A | | 9/1983 | Appel et al. |
| 4,789,592 A | | 12/1988 | Taniguchi et al. |
| 4,795,668 A | | 1/1989 | Krueger et al. |
| 5,057,368 A | | 10/1991 | Largman et al. |
| 5,069,970 A | | 12/1991 | Largman et al. |
| 5,108,820 A | | 4/1992 | Kaneko et al. |
| 5,114,787 A | | 5/1992 | Chaplin et al. |
| 5,162,074 A | | 11/1992 | Hills |
| 5,229,191 A | | 7/1993 | Austin |
| 5,277,976 A | | 1/1994 | Hogle et al. |
| 5,290,628 A | | 3/1994 | Lim et al. |
| 5,336,552 A | | 8/1994 | Strack et al. |
| 5,382,400 A | | 1/1995 | Pike et al. |
| 5,385,775 A | | 1/1995 | Wright |
| 5,466,410 A | | 11/1995 | Hills |
| 5,467,765 A | | 11/1995 | Maturaporn |
| 5,494,736 A | | 2/1996 | Willey et al. |
| 5,665,300 A | | 9/1997 | Brignola et al. |
| 5,683,794 A | | 11/1997 | Wadsworth et al. |
| 5,733,822 A | * | 3/1998 | Gessner .................... B32B 5/02 442/35 |
| 5,814,349 A | | 9/1998 | Geus et al. |
| 5,989,688 A | | 11/1999 | Barge et al. |
| 6,139,675 A | | 10/2000 | Druecke et al. |
| 6,200,669 B1 | | 3/2001 | Marmon et al. |
| 6,368,990 B1 | | 4/2002 | Jennergren et al. |
| 2002/0056510 A1 | | 5/2002 | Erdos et al. |
| 2002/0090875 A1 | | 7/2002 | Lasko et al. |
| 2002/0157766 A1 | | 10/2002 | Vuillaume et al. |
| 2003/0045196 A1 | | 3/2003 | Kumehara |
| 2003/0106195 A1 | | 6/2003 | Fleissner |
| 2004/0083697 A1 | | 5/2004 | Niakin |
| 2004/0243080 A1 | | 12/2004 | Baer |
| 2006/0121811 A1 | | 6/2006 | Mangold et al. |
| 2008/0242175 A1 | | 10/2008 | Narayanan et al. |
| 2010/0249741 A1 | | 9/2010 | Fingal et al. |
| 2010/0324515 A1 | * | 12/2010 | Boscolo .................. D04H 5/06 604/367 |
| 2014/0141216 A1 | | 5/2014 | Kubin |
| 2017/0203542 A1 | | 7/2017 | Ramaratnam et al. |
| 2017/0356109 A1 | | 12/2017 | Goenka et al. |

FOREIGN PATENT DOCUMENTS

| | | |
|---|---|---|
| AU | 2007354395 A1 | 12/2008 |
| BR | P10721661 A2 | 2/2013 |
| CN | 1355864 A | 6/2002 |
| CN | 101525813 A | 9/2009 |
| CN | 101668501 A | 3/2010 |
| CN | 102847374 A | 1/2013 |
| CN | 202658757 U | 1/2013 |
| CN | 202685459 U | 1/2013 |
| CN | 102972391 A | 3/2013 |
| CN | 203032054 U | 7/2013 |
| CN | 203034225 U | 7/2013 |
| CN | 203424350 U | 2/2014 |
| CN | 203507682 U | 4/2014 |
| CN | 203523851 U | 4/2014 |
| CN | 103948188 A | 7/2014 |
| CN | 203802676 U | 9/2014 |
| CN | 104228203 A | 12/2014 |
| CN | 104248052 A | 12/2014 |
| CN | 104248057 A | 12/2014 |
| CN | 104273652 A | 1/2015 |
| CN | 204109465 U | 1/2015 |
| CN | 204136506 U | 2/2015 |
| CN | 104664725 A | 6/2015 |
| CN | 104664829 A | 6/2015 |
| CN | 104664998 A | 6/2015 |
| CN | 104687420 A | 6/2015 |
| CN | 105032033 A | 11/2015 |
| DE | 60030120 T2 | 2/2007 |
| DK | 1192306 T3 | 12/2006 |
| EP | 1192306 A1 | 4/2002 |
| EP | 2152217 A1 | 2/2010 |
| EP | 3254655 A1 | 12/2017 |
| ES | 2270833 T3 | 4/2007 |
| FR | 2202450 A5 | 5/1974 |
| FR | 2794776 A1 | 12/2000 |
| GB | 1 293 009 | 10/1972 |
| GB | 1378232 A | 12/1974 |
| JP | H0411062 A | 1/1992 |
| JP | H04136254 A1 | 5/1992 |
| JP | 2000355878 A | 12/2000 |
| JP | 2003502515 A | 1/2003 |
| JP | 20100527738 A | 8/2010 |
| JP | 4546010 B2 | 9/2010 |
| JP | 2010280648 A | 12/2010 |
| JP | 5184623 B2 | 4/2013 |
| KR | 20150129899 A | 11/2015 |
| PL | 352192 A1 | 8/2003 |
| TR | 200103471 T2 | 7/2002 |
| WO | WO 1998/055295 A1 | 12/1998 |
| WO | WO 99/56588 | 11/1999 |
| WO | 0077286 A1 | 12/2000 |
| WO | WO 2007/134295 A1 | 11/2007 |
| WO | 2008147264 A1 | 12/2008 |
| WO | WO 2015/154543 A1 | 10/2015 |
| WO | WO 2017/030856 A1 | 2/2017 |

OTHER PUBLICATIONS

Written Opinon for Application No. PCT/US2019/032011, dated Sep. 9, 2019.
Chen, Y. et al., *Spunlaced Flax/Polypropylene Nonwoven as Auto Interior Material: Mechanical Performance*, Journal of Industrial Textiles; vol. 38, No. 1 (Jul. 2008) 69-86.
International Search Report for Application No. PCT/US98/11726, dated Sep. 16, 1998.
International Search Report for Application No. PCT/US2007/068892 dated Oct. 26, 2002.
International Search Report for Application No. PCT/CN2015/000195, dated Jun. 26, 2015.
International Search Report for Application No. PCT/US2016/046278, dated Nov. 14, 2016.

* cited by examiner

COMPOSITE SHEET MATERIAL, SYSTEM, AND METHOD OF PREPARING SAME

CROSS REFERENCE TO RELATED APPLICATIONS

This application claims priority to Provisional Application No. 62/670,911, filed May 14, 2018, the entire contents of which are incorporated herein by reference.

FIELD

The present invention relates generally to a composite sheet material for use in absorbent articles, and more particularly, to a system and method of making a composite sheet material comprising at least one spunbond layer and a carded fabric layer.

BACKGROUND

Nonwoven composite sheets made with a combination of various natural fibers and synthetic fibers are known for use in the manufacture of absorbent articles. Such absorbent articles may include disposable hygiene products, such as diapers, women sanitary products, adult incontinent products, and the like.

Typical absorbent articles typically include a multilayer construction having an inner layer (also referred to as a top sheet) defining an inner surface that is in contact with the skin of the wearer. Typically, the back sheet comprises a material that is impervious to fluids so that any fluids absorbed within the absorbent core do not escape or leak.

In some cases, it is desirable to use natural staple fibers to improve the softness of the absorbent article. Typically, such natural fibers are incorporated into a carded fabric layer. Unfortunately, conventional carding systems run much slower than methods of preparing spunbond fabrics. As a result, it has been difficult to incorporate a carding process into an in-line system for preparing a spunbond fabric. In addition, carding systems are limited in their capability to produce low basis weight fabrics. Finally, hydro-entangling of light weight carded webs is very difficult since the energy and momentum of the hydro-entangling water jets will tend to interrupt the uniform lay down of the staple fibers resulting in a non-usable product. In the extreme, the fibers can be blown off of the forming belt or forming drum of the process.

Thus, there exists a need for systems and methods for preparing composite sheet materials having a nonwoven fabric layer and a carded fabric layer.

SUMMARY

Embodiments of the invention are directed to a system and method for the production of a composite nonwoven sheet material comprising at least one spunbond layer and a carded fabric layer. Composite sheet materials in accordance with embodiments of the invention have improved softness, and are particularly suited for the production of absorbent articles. In addition, the provided method and system allow for the production of composite sheet materials having a carded fabric layer that can be performed at line speeds typically associated with spunbond nonwoven fabrics.

In one embodiment, a system for preparing a composite sheet material is provided. The system includes a nonwoven fabric source, a collection surface onto which a nonwoven fabric is deposited, a carding device disposed downstream of the nonwoven fabric source, and overlying the collection surface. The carding device includes a main cylinder onto which staple fibers are deposited and oriented. An air manifold is positioned and arranged relative to the surface of the main cylinder to direct a stream of air (provided by an air source) against the surface of the main cylinder to cause the staple fibers to be dislodged.

The air manifold includes an air inlet in communication with the air source, an air outlet, a fiber inlet, an interior channel, and a fiber outlet, wherein the air outlet is positioned and arranged to direct an air stream against a surface of the cylinder such that fibers disposed on a surface of the cylinder are dislodged and collected into the air stream, the collected fibers then flow into the fiber inlet and through the interior channel to the fiber outlet at which point the fibers are deposited onto a surface of the nonwoven fabric.

The resulting composite sheet material may then be bonded via a bonding unit disposed downstream of the carding device. The bonding unit comprise an air through bonder or a hydraulic entanglement unit. In some embodiments, the system may further comprise one or more drying units, such as a drying oven, to remove water from the composite sheet material.

In some embodiments, a second source of a second nonwoven fabric is positioned downstream of the carding device to deposit a second nonwoven fabric overlying the carded fabric layer. In some embodiments, the nonwoven fabric source comprises a spunbond beam disposed overlying the collection surface. In other embodiments, the nonwoven fabric may be provided as a previously prepared fabric that is unwound from a roll and deposited on the collection surface. The nonwoven fabric of the first or second nonwoven fabric sources may comprise one or more of monocomponent or multicomponent filaments.

In some embodiments, the air manifold includes an air plenum disposed between the air inlet and the air outlet. In one embodiment, the plenum includes an expanding width from the air inlet to the air outlet. The plenum helps to provide a uniform distribution of the air stream that is directed against the surface of the main cylinder. In some embodiments, the air outlet and fiber inlet of the air manifold comprise a single continuous channel. In one embodiment, a width of the fiber outlet approximates the width of the nonwoven fabric.

In some embodiments, the system further comprises one or more vacuum sources that are disposed below the collection surface.

Advantageously, the system provides for the production of a composite sheet materials at line speeds that are typically associated with spunbond fabrics. In particular, the composite sheet material may be prepared at a line speed that is from 600 to 1,200 m/min., and in particular, from 800 to 1,200 m/min.

Further aspects of the invention are directed to a method of preparing a composite sheet material. In one embodiment, the method includes the following steps:

depositing a nonwoven fabric layer onto a collection surface;

introducing a plurality of staple fibers into a carding device, wherein the staple fibers are oriented on a surface of a main cylinder of the carding device;

directing an air stream against the surface of the main cylinder via an air manifold to dislodge the fibers from the surface;

collecting the dislodged fibers into a fiber inlet of the air manifold;

discharging the dislodged fibers from a fiber outlet onto a surface of the nonwoven fabric to form a carded fabric layer; and bonding the nonwoven and carded fabric layers to form a composite sheet material.

In one embodiment, the step of depositing a nonwoven fabric layer comprises extruding a plurality of continuous filaments from a spin beam to form the nonwoven fabric layer. In some embodiments, the method may further comprise a step of depositing a second nonwoven fabric layer overlying the carded fabric layer.

In one embodiment, the step of bonding comprises one or more of air through bonding or subjecting the composite sheet material to a plurality of fluid jets.

In one embodiment, the nonwoven fabric is a spunbond or resin bonded nonwoven fabric. In some embodiments, the nonwoven fabric comprises a spunbond fabric having monocomponent or multicomponent filaments.

The composite sheet material may have a basis weight of 7 to 60 gsm.

In some embodiments, the staple fibers comprise natural fibers. In other embodiments, the staple fibers comprise cotton fibers.

In some embodiments, the nonwoven fabric and the carded fabric layer are deposited at a line speed from 600 to 1,200 m/min.

Other aspects of the invention are directed to a composite sheet material prepared according to aspects of the system and methods discussed above.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. As used in the specification, and in the appended claims, the singular forms "a", "an", "the", include plural referents unless the context clearly dictates otherwise.

I. Definitions

For the purposes of the present application, the following terms shall have the following meanings:

The term "fiber" can refer to a fiber of finite length or a filament of infinite length.

The term "staple fiber" refers to a fibers of finite length. In general staple fibers used in preparing a carded fabric may have a length from about 15 to 65 millimeters (mm), and in particular, from about 20 to 50 mm, and more particularly, from about 25 to 40 mm.

The term "filament" refers to fibers of continuous or substantially continuous length.

As used herein, the term "monocomponent" refers to fibers formed from one polymer or formed from a single blend of polymers. Of course, this does not exclude fibers to which additives have been added for color, anti-static properties, lubrication, hydrophilicity, liquid repellency, etc.

As used herein, the term "multicomponent" refers to fibers formed from at least two polymers (e.g., bicomponent fibers) that are extruded from separate extruders. The at least two polymers can each independently be the same or different from each other, or be a blend of polymers. The polymers are arranged in substantially constantly positioned distinct zones across the cross-section of the fibers. The components may be arranged in any desired configuration, such as sheath-core, side-by-side, pie, island-in-the-sea, and so forth. Various methods for forming multicomponent fibers are described in U.S. Pat. No. 4,789,592 to Taniguchi et al. and U.S. Pat. No. 5,336,552 to Strack et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference.

As used herein, the terms "nonwoven," "nonwoven web" and "nonwoven fabric" refer to a structure or a web of material which has been formed without use of weaving or knitting processes to produce a structure of individual fibers or threads which are intermeshed, but not in an identifiable, repeating manner. Nonwoven webs have been, in the past, formed by a variety of conventional processes such as, for example, meltblown processes, spunbond processes, and staple fiber carding processes.

As used herein, the term "carded fabric" refers to a nonwoven fabric comprising staple fibers that are predominantly aligned and oriented in the machine direction using a carding process. Processes and systems for preparing carded fabrics are disclosed, for example, in U.S. Pat. Nos. 3,145, 425 and 5,494,736.

As used herein, the term "meltblown" refers to a process in which fibers are formed by extruding a molten thermoplastic material through a plurality of fine, usually circular, die capillaries into a high velocity gas (e.g. air) stream which attenuates the molten thermoplastic material and forms fibers, which can be to microfiber diameter. Thereafter, the meltblown fibers are carried by the gas stream and are deposited on a collecting surface to form a web of random meltblown fibers. Such a process is disclosed, for example, in U.S. Pat. No. 3,849,241 to Buntin et al.

As used herein, the term "machine direction" or "MD" refers to the direction of travel of the nonwoven web during manufacturing.

As used herein, the term "cross direction" or "CD" refers to a direction that is perpendicular to the machine direction and extends laterally across the width of the nonwoven web.

As used herein, the term "spunbond" refers to a process involving extruding a molten thermoplastic material as filaments from a plurality of fine, usually circular, capillaries of a spinneret, with the filaments then being attenuated and drawn mechanically or pneumatically. The filaments are deposited on a collecting surface to form a web of randomly arranged substantially continuous filaments which can thereafter be bonded together to form a coherent nonwoven fabric. The production of spunbond non-woven webs is illustrated in patents such as, for example, U.S. Pat. Nos. 3,338,992; 3,692,613, 3,802,817; 4,405,297 and 5,665,300. In general, these spunbond processes include extruding the filaments from a spinneret, quenching the filaments with a flow of air to hasten the solidification of the molten filaments, attenuating the filaments by applying a draw tension, either by pneumatically entraining the filaments in an air stream or mechanically by wrapping them around mechanical draw rolls, depositing the drawn filaments onto a foraminous collection surface to form a web, and bonding the web of loose filaments into a nonwoven fabric. The bonding can be any thermal or chemical bonding treatment, with thermal point bonding being typical.

As used herein, the terms "hydro-bonding," "hydroentangled," and "hydraulically entangled" involves subjecting a material such as one or more webs of fibers to be bonded below a plurality of nozzles/jets that provide one or more high pressure jets of water which impinge on the surface of the material. The jets of high pressure water penetrate into the web of fibers causing the fibers of adjacent layers to be mechanically entangled with each other, and thereby bond the layers of the web to each other.

As used herein, the term "air through thermal bonding" involves passing a material such as one or more webs of fibers to be bonded through a stream of heated gas, such as air, in which the temperature of the heated gas is above the softening or melting temperature of at least one polymer component of the material being bonded. Air through thermal bonding may also involve passing a material through a heated oven.

As used herein, the term "thermal point bonding" involves passing a material such as one or more webs of fibers to be bonded between a heated calender roll and an anvil roll. The calender roll is typically patterned so that the fabric is bonded in discrete point bond sites rather than being bonded across its entire surface.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material, including isotactic, syndiotactic and random symmetries.

The term "composite", as used herein, may be a structure comprising two or more layers, such as a fiber layer or a plurality of fiber layers bonded together. The two layers of a composite structure may be joined together such that a substantial portion of their common X-Y plane interface, according to certain embodiments of the invention.

The terms "about" and "substantially" as used herein means a deviation (plus/minus) of less than 10%, and in particular, less than 5%, less than 4%, less than 3%, less than 2%, and less than 1% of the recited value.

II. Composite Sheet Material

In one aspect, embodiments of the present invention are directed to a composite sheet material comprising at least one spunbond layer and a carded fabric layer overlying the spunbond layer. Composite sheet materials in accordance with embodiments of the present invention may be particularly useful in the manufacture of absorbent articles, and in particular, feminine hygiene products and diaper products.

Figure 1:
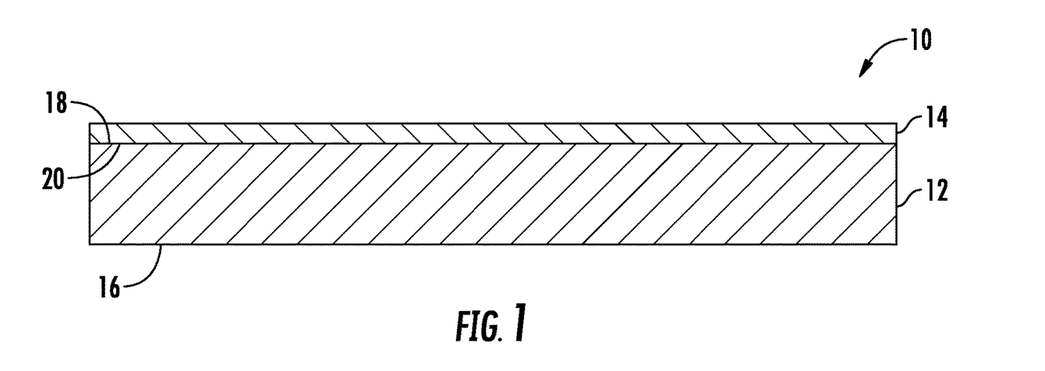
FIG. 1 is a cross-sectional side view of a composite sheet in accordance with at least one embodiment of the present invention.

With reference to FIG. 1, a composite sheet material in accordance with at least one embodiment of the invention is shown and designated by reference character 10. In the illustrated embodiment, the composite sheet material comprises a spunbond layer 12 and a carded fabric layer 14 overlying the spunbond layer. The spunbond layer 12 includes at least one nonwoven layer having a first outer surface 16 and a second outer surface 18. Similarly, the carded fabric layer 14 includes a first outer surface 20 and a second outer surface 22.

In one embodiment, the outer surface 18 of the spunbond layer 12 is disposed adjacent and opposite outer surface 20 of the carded fabric layer 14. In preferred embodiments, the opposing outer surfaces 18, 20 of the spunbond layer and the carded fabric layer 12, 14 are disposed directly opposite each other so that the surfaces of each component are in contact with each other.

Figure 2:
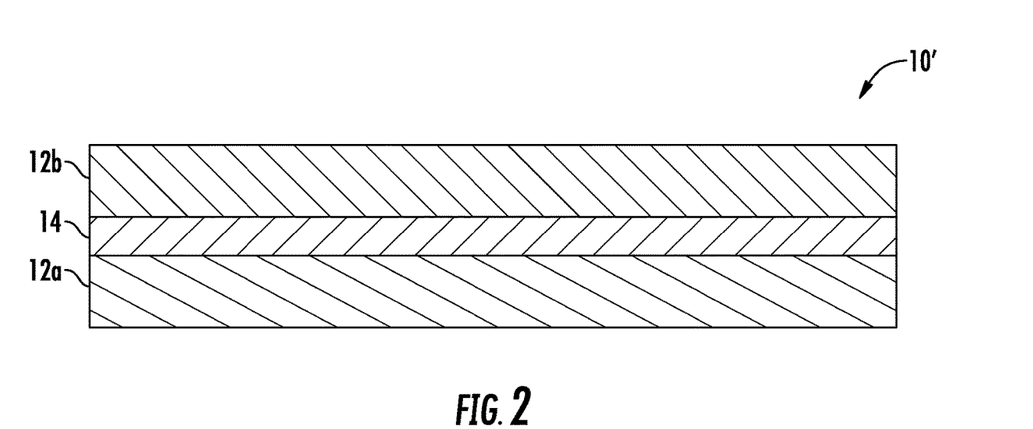
FIG. 2 is a cross-sectional side view of a composite sheet in accordance with at least one embodiment of the present invention.

In some embodiments, the composite sheet material 10 may comprise two or more spunbond layers. In this regard, FIG. 2 illustrates an embodiment of the invention in which the carded fabric layer 14 is disposed between a first spunbond layer 12a and a second spunbond layer 12b.

Generally, the composite sheet may have a basis weight basis weight ranging from about 7 to 60 grams per square meter (gsm), and in particular, from about 10 to 40 gsm, and more particularly, from about 10 to 25 gsm. In a preferred embodiment, the composite sheet has a basis weight that is about 15 to 25 gsm.

In general, the mass of the one or more spunbond layer(s) comprises from about 50 to 95 weight percent of the composite sheet, based on the total weight of the composite sheet. In one embodiment, the mass of the spunbond layer(s) comprises from about 70 to 90 weight percent of the composite sheet, and in particular, from about 75 to 85, based on the total weight of the composite sheet.

The mass of the carded fabric layer comprises from about 5 to 50 weight percent of the composite sheet, based on the total weight of the composite sheet. In one embodiment, the mass of the carded fabric layer comprises from about 10 to 30 weight percent of the composite sheet, and in particular, from about 15 to 25, based on the total weight of the composite sheet.

A. Spunbond Layer(s)

The spunbond layer may be prepared utilizing conventional spunbond equipment and processes. In this regard, the spunbond fabric layer may be produced, for example, by the conventional spunbond process on spunbond machinery such as, for example, the Reicofil-3 line or Reicofil-4 line from Reifenhauser, as described in U.S. Pat. No. 5,814,349 to Geus et al, the entire contents of which are incorporated herein by reference, wherein molten polymer is extruded into continuous filaments which are subsequently quenched, attenuated pneumatically by a high velocity fluid, and collected in random arrangement on a collecting surface. In some embodiments, the continuous filaments are collected with the aid of a vacuum source positioned below the collection surface. After filament collection, any thermal, chemical or mechanical bonding treatment may be used to form a bonded web such that a coherent web structure results. As one skilled in the art will understand, examples of thermal bonding may include thru-air bonding where hot air is forced through the web to soften the polymer on the outside of certain fibers in the web followed by at least limited compression of the web or calender bonding where the web is compressed between two rolls, at least one of which is heated, and typically one is an embossed roll.

The spunbond fibers may comprise monocomponent or multicomponent fibers. Examples of bicomponent fibers include side-by-side, islands in the sea, and sheath/core arrangements. Preferably, the fibers have a sheath/core structure in which the sheath comprises a first polymer component, and the core comprises a second polymer component. In this arrangement, the polymers of the first and second polymer components may be the same or different from each other. For example, in one embodiment, the sheath comprises a first polymer component, and the core comprises a second polymer component that is different or the same as the first polymer component. In a preferred embodiment, the first and second polymer components of the bicomponent fibers are different from each other.

In some embodiments the spunbond fibers of the spunbond fabric layer may have a sheath/core configuration in which the core is centered relative to the sheath. Alternatively, the core may be present in an off-set configuration relative to the sheath. In this configuration, the core not centrally aligned relative to the sheath. As a result, when heat is applied, such as during bonding, the fibers will have a tendency to curl or crimp due, which in turn may help provide loft to the fluid distribution layer.

In one embodiment, the first polymer component of the sheath comprises a polymer having a lower melting temperature than that of the second polymer component comprising the core. The lower melting polymer of the sheath will promote bonding while the polymer component of the core having a higher melting temperature will provide strength to the fiber and thus to the final bonded nonwoven.

Generally, the weight percentage of the sheath to that of the core in the fibers may vary widely depending upon the desired properties of the nonwoven fabric. For example the weight ratio of the sheath to the core may vary between about 10:90 to 90:10, and in particular from about 20:80 to 80:20. In a preferred embodiment, the weight ratio of the sheath to the core is about 25:75 to 35:65, with a weight ratio of about 30:70 being preferred.

Generally, the spunbond layer(s) has a basis weight ranging from about 6 to 45 grams per square meter (gsm), and in particular, from about 8 to 20 gsm, and more particularly, from about 10 to 15 gsm. In a preferred embodiment, the spunbond layer has a basis weight that is about 10 gsm.

The spunbond fibers may have a variety of different cross-section shapes. For example, the spunbond fibers may be have round or substantially round cross-section, or may have a shaped cross-section, such as a trilobal shape.

A wide variety of polymers may be used for preparing spunbond fibers for use in the spunbond layer. Examples of suitable polymers may include polyolefins, such as polypropylene and polyethylene, and copolymers thereof, polyesters, such as polyethylene terephthalate (PET), polytrimethylene terephthalate (PTT), and polybutylene terephthalate (PBT), nylons, polystyrenes, copolymers, and blends thereof, and other synthetic polymers that may be used in the preparation of fibers. In one embodiment, the spunbond fibers have a sheath/core configuration comprising a polyethylene sheath and a polypropylene core. In other embodiments, the spunbond fibers may have a sheath/core configuration comprising a polyethylene sheath and a polyester core, such as a core comprising polyethylene terephthalate. In a preferred embodiment, the spunbond fibers comprise polypropylene.

The above noted polymers are generally considered to be derived from synthetic sources, such as a petroleum derived polymer. In some embodiments, it may be desirable to provide a spunbond layer comprising one or more sustainable polymer components. In contrast to polymers derived from petroleum sources, sustainable polymers are generally derived from a bio-based material. In some embodiments, a sustainable polymer component may also be considered biodegradeable. A special class of biodegradable product made with a bio-based material might be considered as compostable if it can be degraded in a composing environment. The European standard EN 13432, "Proof of Compostability of Plastic Products" may be used to determine if a fabric or film comprised of sustainable content could be classified as compostable.

In one such embodiment, the spunbond layer comprises spunbond fibers comprising a sustainable polymer component. Preferably, the spunbond fibers are substantially free of synthetic materials, such as petroleum-based materials and polymers. For example, fibers comprising the spunbond layer may have less than 25 weight percent of materials that are non-bio-based, and more preferably, less than 20 weight percent, less than 15 weight percent, less than 10 weight percent, and even more preferably, less than 5 weight percent of non-bio-based materials, based on the total weight of the spunbond layer.

A preferred sustainable polymer for use in the present invention comprises polylactic acid (PLA).

In certain embodiments, the spunbond fibers may comprised bicomponent filaments in which the sheath and the core both comprise a PLA resin. In these embodiments, a PLA spunbond nonwoven fabric may be provided that is substantially free of synthetic polymer components, such as petroleum-based materials and polymers. For example, the fibers of the PLA spunbond nonwoven fabric may have a bicomponent arrangement in which the both components are PLA based to thus produce a fiber that is 100% PLA. As used herein, "100% PLA" may also include up to 5% additives including additives and/or masterbatches of additives to provide, by way of example only, color, softness, slip, antistatic protection, lubricity, hydrophilicity, liquid repellency, antioxidant protection and the like. In this regard, the nonwoven fabric may comprise 95-100% PLA, such as from 96-100% PLA, 97-100% PLA, 98-100% PLA, 99-100% PLA, etc. When such additives are added as a masterbatch, for instance, the masterbatch carrier may primarily comprise PLA in order to facilitate processing and to maximize sustainable content within the fibers. For example, the PLA staple fibers of the fluid distribution layer may comprise one or more additional additives. In such embodiments, for instance, the additive may comprise at least one of a colorant, a softening agent, a slip agent, an antistatic agent, a lubricant, a hydrophilic agent, a liquid repellent, an antioxidant, and the like, or any combination thereof.

In one embodiment, the PLA polymer of the sheath may be the same PLA polymer as that of the core. In other embodiments, the PLA polymer of the sheath may be a different PLA polymer than that of the core. For example, the bicomponent fibers may comprise PLA/PLA bicomponent fibers such that the sheath comprises a first PLA grade, the core comprises a second PLA grade, and the first PLA grade and the second PLA grade are different (e.g., the first PLA grade has a lower melting point than the second PLA grade). By way of example only, the first PLA grade may comprise up to about 5% crystallinity, and the second PLA grade may comprise from about 40% to about 50% crystallinity.

In some embodiments, for instance, the first PLA grade may comprise a melting point from about 125° C. to about 135° C., and the second PLA grade may comprise a melting point from about 155° C. to about 170° C. In further embodiments, for example, the first PLA grade may comprise a weight percent of D isomer from about 4 wt. % to about 10 wt. %, and the second PLA grade may comprise a weight percent of D isomer of about 2 wt. %.

For example, in one embodiment, the core may comprise a PLA having a lower % D isomer of polylactic acid than that of the % D isomer PLA polymer used in the sheath. The PLA polymer with lower % D isomer will show higher degree of stress induced crystallization during spinning while the PLA polymer with higher D % isomer will retain a more amorphous state during spinning. The more amorphous sheath will promote bonding while the core showing a higher degree of crystallization will provide strength to the fiber and thus to the final bonded web. In one particular embodiment, the Nature Works PLA Grade PLA 6752 with 4% D Isomer can be used as the sheath while NatureWorks Grade 6202 with 2% D Isomer can be used as the core.

In some embodiments, the fabric may comprise polyethylene or polypropylene derived from sustainable sources. An example of a suitable sugar cane derived polyethylene is available from Braskem S.A. under the product name PE SHA7260.

In some embodiments, the sheath may comprise a PLA polymer and the core a synthetic polymer, such as polypropylene, polyethylene, or a polyester, or a core comprising polyethylene or polypropylene derived from sustainable sources.

B. Other Nonwoven Fabric Layers

In some embodiments, the composite sheet material may include a resin bonded layer that is used in lieu or in addition to the spunbond bond layer. The resin bonded layer comprises a carded fabric using a resin or adhesive material to bond the fibers together. Typically, resin bonded fabrics comprises staple fibers having lengths ranging from 35 to 60 mm. The same polymers that are used in the preparation of the spunbond layer may be used in the preparation of the staple fibers for the resin bonded layer.

When using resin bonded layer, the resin bonded fabric is typically preformed and provided on a roll from which it is unwound onto the collection surface.

C. Carded Fabric Layer

The carded fabric layer 14 includes at least one carded layer comprising natural staple fibers. Generally, natural fibers are derived from plants or animals. Natural fibers derived from plants typically comprise cellulose materials, and may include cotton fibers, flax fibers, hemp fibers, grass fibers, such as elephant grass, jute fibers, abaca fibers, coir fibers, ramie fibers (also known as Chinese grass), sisal fibers, and the like.

Natural fibers derived from animals may include wool, silk, camel hair, alpaca wool, cashmere, angora wool, and the like. In a preferred embodiment, the natural fibers comprise cotton fibers.

In some embodiments, the carded fabric layer may comprises a blend of cellulose staple fibers and non-cellulose staple fibers. As discussed in greater detail below, the at least one carded fabric layer is deposited onto a surface of a spunbond layer, and the resulting composite sheet material is then bonded to form a coherent composite structures in which the spunbond fibers of both the spunbond layer and the carded layer are bonded to each other.

During the process of making the composite sheet material, the natural staple fibers are injected onto a card and then deposited onto a surface of the spunbond layer via an air manifold. Thereafter, the fibers of the spunbond layer and carded layer are bonded to each other via mechanical bonding (e.g., hydroentanglement, needle punching, or the like), or by thermal bonding, such as passing the composite sheet material through a calender, or via through air bonding.

A wide variety of different cellulose materials may be used for the cellulose fibers. Fibers from Esparto grass, bagasse, kemp, flax, and other lignaceous and cellulose fiber sources may be utilized. Other fibers include absorbent natural fibers made from regenerated cellulose, polysaccharides or other absorbent fiber-forming compositions. In a preferred embodiment, the staple fibers comprise non-bleached cotton fibers having fiber lengths ranging from about 15 to 38 mm. Examples of cotton fibers for use to form such nonwoven fabrics include fibers sold under the product name TRUECOTTON® available from TJ Beall Company. It is noted that the non-bleached cotton fibers are easier to process in the carding process in comparison to bleached cotton fibers. However, in some embodiments bleached cotton fibers may be used, but not necessarily with equivalent results.

When present, suitable materials for the non-cellulose staple fibers for use in the carded layer may comprise monocomponent or multicomponent fibers, or mixtures of moncomponent and multicomponent fibers. In a preferred embodiment, the non-cellulose staple fibers of the air laid layer comprise bicomponent fibers having a sheath/core configuration.

The staple fibers typically have lengths ranging from about 15 to 65 mm, and in particular, from about 20 to 15 mm, and more particularly, from about 25 to 45 mm.

The basis weight of the carded fabric layer may range from about 1 to 12 gsm, and in particular, from about 2 to 8 gsm, and more particularly, from about 2 to 6 gsm. In a preferred embodiment, the carded fabric layer has a basis weight that is about 2 to 4 gsm.

In some embodiments, composite sheet materials in accordance with the present invention may comprise a high percentage of sustainable materials. For example, the composite sheet material may have a sustainable content of at least 75 weight percent, based on the total weight of the pad, such as comprising a bio-based material content that is at least 80%, 85%, 90%, 95% or 100% by weight of the composite sheet material.

III. System and Method of Preparing the Composite Sheet Material

Advantageously, the inventive system and method allows for deposition of a relatively light weight carded layer onto a surface of the spunbond layer. In addition, the system and process allows for the deposition of the carded fabric layer onto the spunbond layer at relatively high processing speeds. As briefly noted above, conventional carding processes are typically run at processing speeds (e.g., 100 to 250 m/min.) that are significantly lower than the speeds at which spunbond fabrics are prepared. For example, typical line speeds for preparing spunbond fabrics is from about 800 to 1,200 m/min. As a result, it has been difficult to prepare composite sheet materials comprising one or more spunbond layers and a carded layer in a continuous in-line process.

Figure 3:
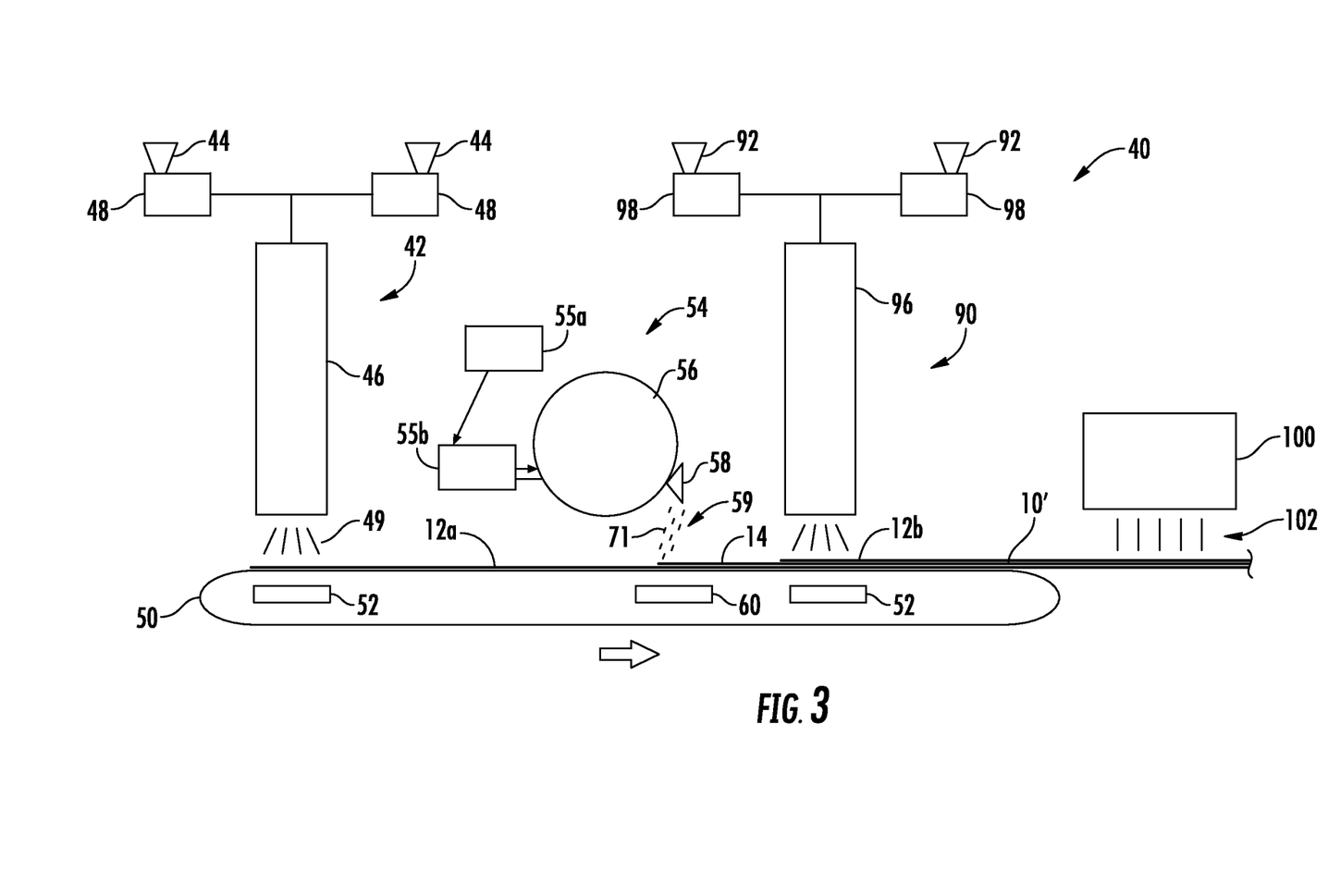
FIG. 3 is a schematic illustration of a system for preparing a composite sheet in accordance with at least one embodiment of the present invention.

With reference to FIG. 3, a system and associated process for preparing the composite sheet material is shown and designated with reference character 40. As shown, the system 40 includes a first spunbond beam 42, a polymer source (i.e. hopper) 44 is in fluid communication with the spin beam 46 via the extruder 48. Although FIG. 3 illustrates an embodiment having two polymer sources 44 and two extruders 48, the system may include any number of polymer sources (e.g., PLA, synthetic polymer, such as polypropylene, polyethylene, etc.) and extruders as dictated by a particular application as understood by one of ordinary skill in the art. For example, in some embodiments the spin beam may include a single polymer source and extruder.

Following extrusion, the extruded polymer may then enter a plurality of spinnerets (not shown) for spinning into filaments. Following spinning, the spun filaments may then be drawn (i.e. attenuated) via a drawing unit (not shown) and randomized in a diffuser (not shown). The spin beam 46 produces a curtain of filaments 49 that is deposited on the collection surface 50 to form a spunbond web.

In some embodiments and as shown in FIG. 3, the system may comprise a vacuum source 52a disposed below the collection surface for pulling the plurality of spunbond continuous filaments from the outlet of the spin beam onto the collection surface.

A carding device 54 is positioned downstream of the spin beam 46. The carding device 54 comprises various cylinders (not shown) that deposit a plurality of fibers onto a main cylinder 56. The carding system includes a staple fiber source 55a and a plurality of associated rolls and devices (e.g., feed roller, clearer roller, transfer roller, etc. (collectively identified as reference character 55b) that deposit the staple fibers onto the main cylinder 56. The main cylinder includes a carding wire that, in combination with a plurality of smaller cylinders (not shown), separates and aligns the staple fibers. It should be recognized that the various cylinders and rollers associated with a carding device are known to one of ordinary skill in the art, and therefore further discussion of these features are not required to understand the scope of the inventive system and process. In conventional carding systems, the carding device also includes one or more doffers and take-off rolls that are utilized to remove the carded fibers from the main cylinder. In the instant system, the doffer and associated rolls are replaced with an air manifold as explained below.

The air manifold 58 is positioned on the downstream side of the main cylinder 56 above the collection surface 50. Air manifold 58 is configured and arranged to introduce a stream of air that impinges on the surface of the main cylinder 56 with sufficient air velocity to cause the carded fibers 71 to dislodge from the surface of the main cylinder and enter into an interior of the air manifold via an inlet (e.g., a continuous slot or semi-continuous slot) that extends laterally along the width of the air manifold. The combination of air and dislodged fibers then flow through a central channel within the air manifold, and are discharged from a fiber outlet (e.g., a second continuous slot or semi-continuous slot). The stream discharged fibers 59 are then deposited onto the surface of the spunbond layer as a substantially uniform and relatively lightweight carded fabric layer. The fiber outlet of the air manifold is typically positioned from about 2 to 5 cm above the surface of the collection surface, and in particular, from about 2 to 3 cm above the surface of the collection surface.

Generally, the air velocity of the air impacting the surface of the cylinder is selected to dislodge the fibers from the surface of the cylinder and convey the fibers through the air manifold.

In some embodiments, a vacuum source 60 is disposed below the collection surface for pulling the dislodged staple fibers from the outlet of the air manifold onto the collection surface.

Figure 4:
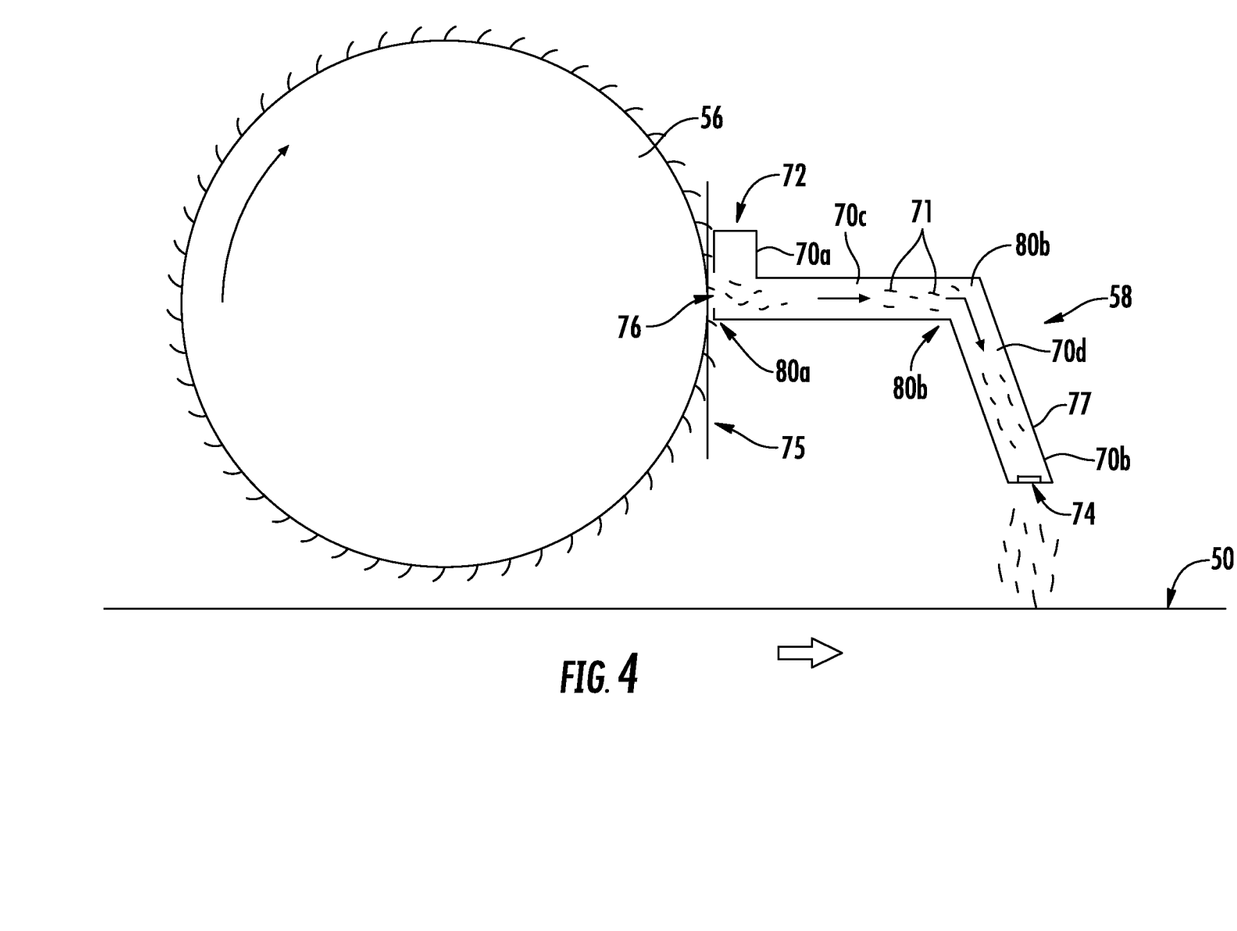
FIG. 4 is side view schematic of a carding cylinder with an associated air manifold for collecting fibers off the surface of the carding cylinder.
Figure 5A:
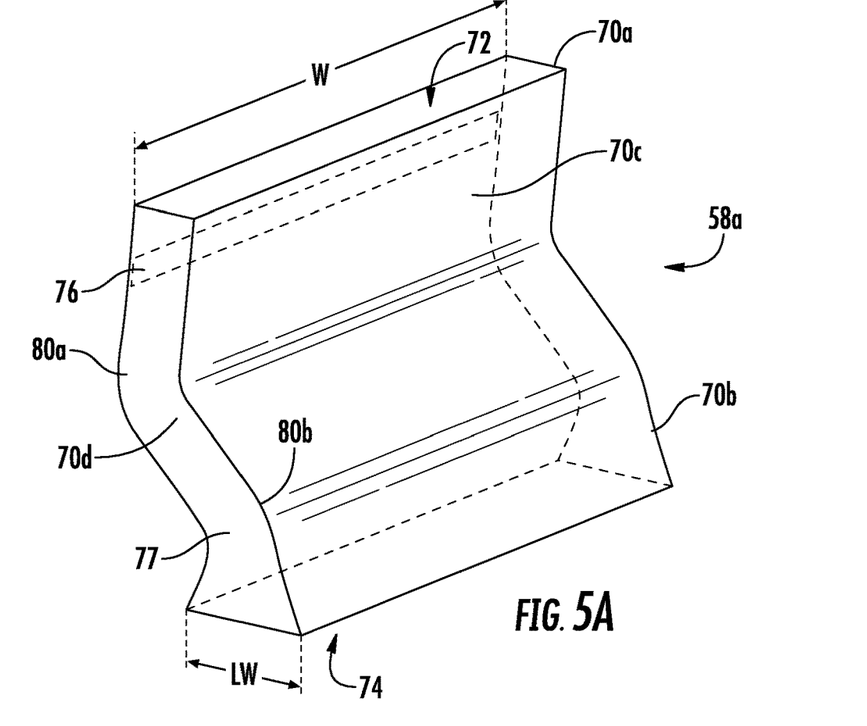
FIGS. 5A and 5B provide perspective views of embodiments of air manifolds in accordance with at least one embodiment of the present invention.
Figure 5B:
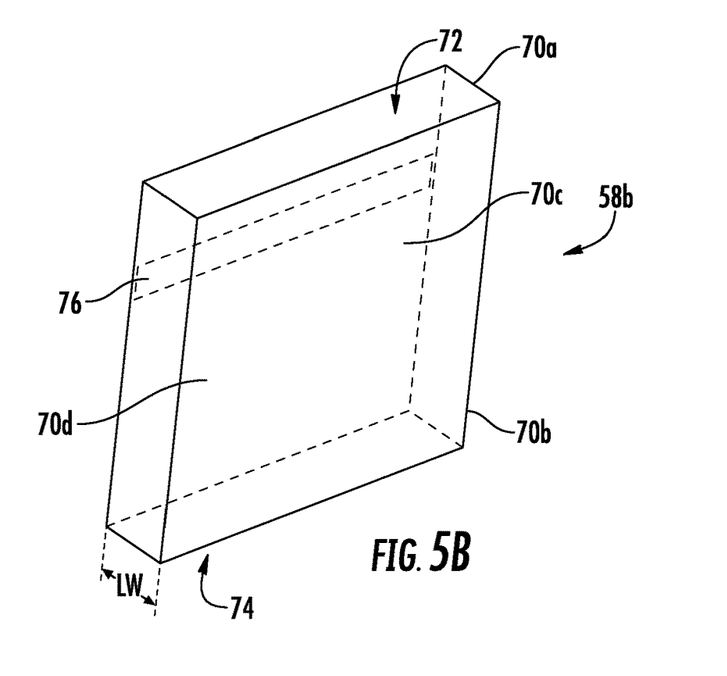

With reference to FIG. 4, a cross-sectional side view of the air manifold 58 is shown relative to the main cylinder 56 and the collection surface. FIGS. 5A and 5B show perspective views of air manifolds 58a and 58b, respectively. The air manifold includes a proximal end 70a and a distal end 70b. An air inlet 72 that is in communication with an air source (not shown) is disposed towards the proximal end of the air manifold. Typically, the air source comprises a blower or condenser that provides a steady stream of air at a desired air velocity and pressure. A stream of air is introduced into an interior space 70c of the air manifold via the air inlet 72. The air stream flows from the air inlet towards the distal end 70b of air manifold from which it is discharged via a fiber outlet 74.

The fiber outlet 74 typically comprises a continuous or semi-continuous slot or channel that extends laterally across the width of the fiber distribution outlet. In other words, the fiber outlet extends in the cross direction relative to the collection surface. Generally, the lateral width of the fiber outlet is from about 1.75 to 6.5 cm, and in particular, from about 2 to 5.5, and more particularly, from about 2.5 to 5 cm.

The interior space 70c of the air manifold defines an interior channel 70d having a width W that is approximately the cross direction width of the main cylinder 56. The air manifold includes a fiber inlet 76 that extends laterally across the cross directional width of the air manifold, and is disposed downstream of the air inlet 72. The fiber inlet typically comprises a continuous or semi-continuous slot or channel having a length that extends laterally across the width of the air manifold. Generally, the lateral width of the fiber inlet is from about 1 to 2 cm, and in particular, from about 2 to 5.5, and more particularly, from about 3 to 5 cm.

Preferably, the air stream flowing through the interior channel 70d tangentially impacts the surface of the main cylinder via fiber inlet 76. That is, the air stream impacts a point of curve of the main cylinder at an angle of substantially 180° (i.e., a tangent plane (see line 75, FIG. 4) is defined at the point at which the air stream impacts the surface of the main cylinder), such that the angle defined by the air stream and the tangent plane is less than 10°, and in particular, less than 5° relative to the tangent plane. Preferably, the angle defined by the air stream and the tangent plane is from about 0° to 5°, and in particular, from about 1° to 4°.

In the embodiment illustrated in FIG. 5A, the distal end 70b of the air manifold includes a fiber distribution member 77 having the fiber outlet 74 that is configured and arranged to discharge a uniform stream of fibers cross directionally across the surface of the previously prepared spunbond layer. The fiber distribution member is disposed downstream of the fiber inlet 72 and generally includes an expanding air plenum having a lateral width LW that increases as it approaches the fiber outlet 74. The expanding lateral width of the fiber distribution member helps to reduce the velocity of the fibers as they are discharged from the air manifold. In some embodiments, the lateral width of the distal end 70b of the air manifold is from about 20 to 250% greater than the lateral width of the proximal end of the air manifold, and in particular from about 40 to 100%, and more particularly, from about 50 to 75% greater than the lateral width of the proximal end of the air manifold.

As further shown in FIG. 5a, the air manifold may also include a non-linear shape as exemplified by the series of bends 80a, 80b that are disposed between the fiber inlet 76 and the fiber outlet 74. Here, it can be seen that the curves generally have an s-like shape. In some embodiments, the air manifold may include a single curve or multiple curves (e.g., 1 to 6 curves or 1-4 curves). The presence of curves may help to decrease the velocity of the air stream and fibers prior to being discharged from the fiber outlet 74. In other embodiments, the curves may define one or more angled surfaces, such as angles ranging from 10 to 90°, and in particular, from about 20 to 30°.

FIG. 5b shows an embodiment of the air manifold 58b in which the lateral width LW of the air manifold remains relatively constant between the air inlet 72 and the air outlet. In particular, in this embodiment, the lateral width of the air manifold does not expand laterally outward as it approaches the distal end 70b of the air manifold. The embodiment shown in FIG. 5b also does not include any bends or curves, such as those shown in the embodiment of FIG. 5a.

During use, a stream of air is introduced into the air manifold via the inlet channel. The stream of air flows through the interior channel 70d to provide a uniform stream of air that impinges onto the surface of the main cylinder resulting in dislodgement of the fibers from the surface of the main cylinder. The stream of air with the dislodged fibers are then drawn into the main body of the air manifold. The combined flow of dislodged fibers and air then flows through the interior channel 70d of the air manifold and into the fiber distribution member from which they are discharged from the fiber outlet 74. The discharged fibers are collected onto a surface of the spunbond layer. The carded fibers are deposited as a uniform and lightweight fabric layer. Preferably, the velocity of the air stream flowing through the air manifold is greater than the rotational velocity of the main cylinder 56, which helps to entrain the fibers within the air stream as it flows through the air manifold.

In the illustrated embodiments, the air manifold includes a single fiber inlet from which air impinges the surface of the cylinder, and then draws the air stream and dislodged fibers into the fiber inlet. In other embodiments, the air manifold may include a separate air stream that is disposed upstream of the fiber inlet, and that also extends across the length of the air manifold. In this embodiment, a portion of the air stream exits the air outlet and causes the fibers to be dislodged from the cylinder. The dislodged fibers and air stream then flow back into the air manifold through the fiber inlet, and are subsequently discharged as a stream of fibers from the fiber outlet.

Referring back to FIG. 3, the system may include an optional second spunbond beam 90 disposed downstream of the carding device 54. As in the first spunbond beam 42, the second spunbond beam includes a polymer source (i.e. hopper) 92 is in fluid communication with the spin beam 96 via the extruder 98. Although FIG. 3 illustrates an embodiment having two polymer sources 92 and two extruders 98, the system may include any number of polymer sources as discussed above.

In some embodiments and as shown in FIG. 3, the system may comprise a vacuum source 52b disposed below the collection surface for pulling the plurality of spunbond continuous filaments from the outlet of the second spin beam onto the collection surface.

Although FIG. 3 shows three separate vacuum sources (e.g., 52a, 52b, and 60), it should be recognized that the system may include additional vacuum sources, or a single vacuum source that extends below each of the spunbond beams and the carding device.

Following deposition of one or more of the layers, the composite sheet material is then subjected to a bonding step. Bonding may be performed using known bonding techniques including thermal bonding, mechanical bonding, or a combination thereof.

In a preferred embodiment, the composite sheet material is bonded via hydroentangling with hydroentanglement unit 100. Hydroentanglement unit 100 includes a plurality of water jets 102 that are directed against the composite sheet material to hydroentangle the fibers of adjacent layers to with each other to form a coherent composite sheet comprising one or more spunbond layers and the carded fabric layer. Following hydroentanglement, the composite sheet material may be passed through one or more ovens (not shown) to dry the composite sheet material.

In some embodiments, the composite sheet material may be thermally bonded, such as air through bonding or thermal point bonding. In through air bonding a stream of heated gas, such as air, is introduced through the composite sheet material. For example, in one embodiment the composite sheet material is passed through an oven that it heated to a temperature that is above the melting temperature of the spunbond fibers, which causes the polymer component of the spunbond fibers to at least partially soften and flow so that upon cooling the fibers fuse and bond to adjacent natural staple fibers.

It should be recognized that the composite sheet may include any number of spunbond and carded fabric layers, which may or may not be arranged in alternating sequence. It should also be recognized that although the process of above was generally described in term of a continuous in-line process in which the spunbond fabric is prepared on the same production line as the carded fabric layer, the composite sheet material may be prepared by providing a previously prepared spunbond fabric (e.g., provided in a roll form) that is rolled out onto the collection surface, and then followed by depositing the carded fabric layer onto the surface of the spunbond fabric as discussed above.

Advantageously, it has been discovered that the use of the above discussed carding device allows for the production of composite sheet materials at line speeds approaching and/or in excess of speeds at which conventional spunbond fabrics are prepared. In accordance with certain embodiments, for instance, the system may be configured to prepare the composite sheet material at a line speeds greater than about 600 m/min. In other embodiments, for example, the system may be configured to prepare the composite sheet material at a lines speed from about 800 m/min to about 1,200 m/min.

IV. Absorbent Articles

Composite sheets in accordance with the present invention may be used in a wide variety of different articles, and in particular, a wide variety of absorbent articles. For example, the composite sheet material may be used for the preparation of top sheets, back sheets, waist bands, ears and back sheet covers in the production of diapers and adult incontinence articles. The composite sheet material may also be used in the production of feminine hygiene articles including pads and liners.

In other embodiments, the composite sheet material may be used for the production of bed pads, such as hospital bed pads, and the product of absorbent wipes.

Figure 6:
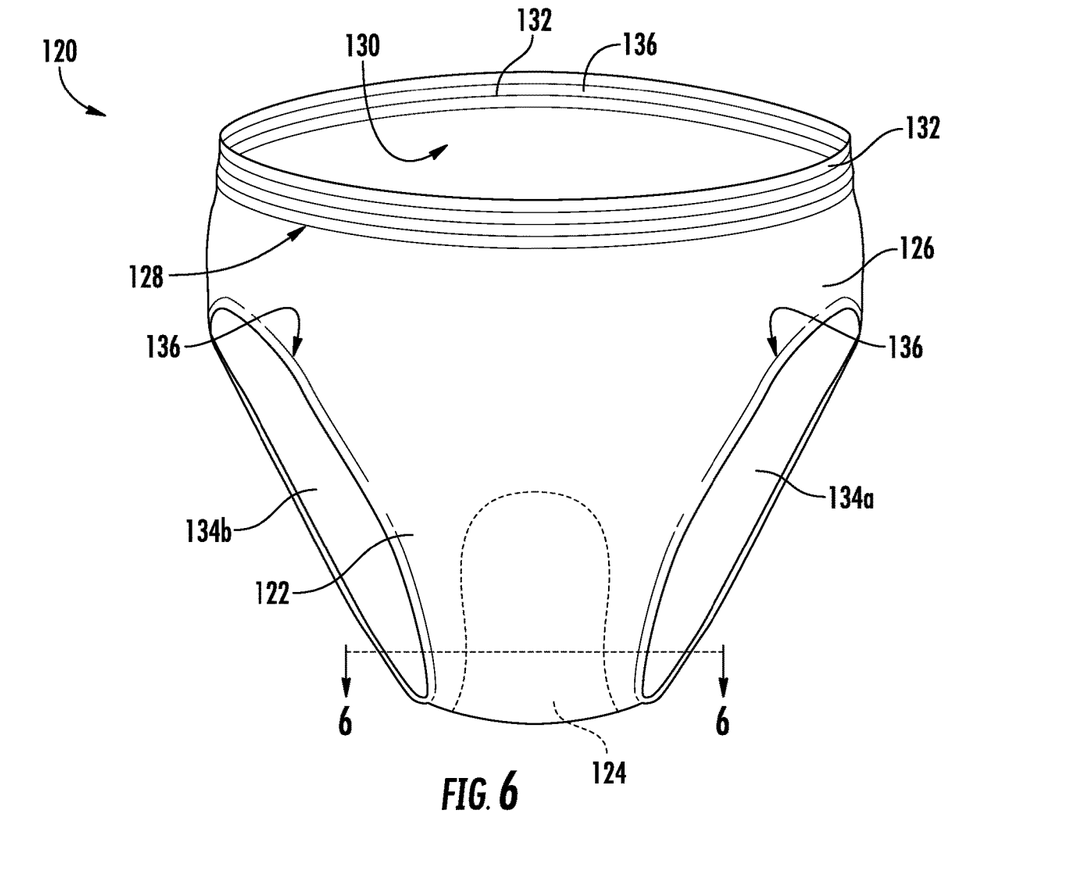
FIG. 6 is an illustration of an absorbent article in accordance with at least one embodiment of the present invention.

With reference to FIG. 6, an embodiment of an absorbent article ("diaper") in accordance with embodiments of the present invention is shown and broadly designated by reference character 120. The diaper 120 includes a core region 122 in which an absorbent core 124 is disposed. A chassis region 126 surrounds the core region 122. The chassis region includes a front 128, back 130, and waist regions 132. The core region 122 is generally positioned in the crotch area of the diaper and extends at least partially into the front 128 and back 130 regions of the diaper.

The diaper shown in FIG. 6 is generally intended to enclose the lower part of the wearer's trunk like a pair of absorbent pants. As shown, the diaper may include leg openings 134a, 134b through which the wearer's legs are inserted. Although not illustrated in the embodiment of FIG. 6, the diaper may also include elastic cuffs that are disposed about the perimeter of the leg openings in order to contain fluids or exudates within the diaper.

In some embodiments, the diaper may also include elastic elements 136 that are disposed around one or more of the waist region 132 and leg openings 134a, 134b. The elastic elements may comprise elastic strings or threads that are contractably affixed between the topsheet and backsheet of the diaper.

In other embodiments, the front and back regions of the diaper may be joined to each other along adjacent longitudinal edges with ultrasonic, thermal, adhesive seals, or the like.

Figure 7:
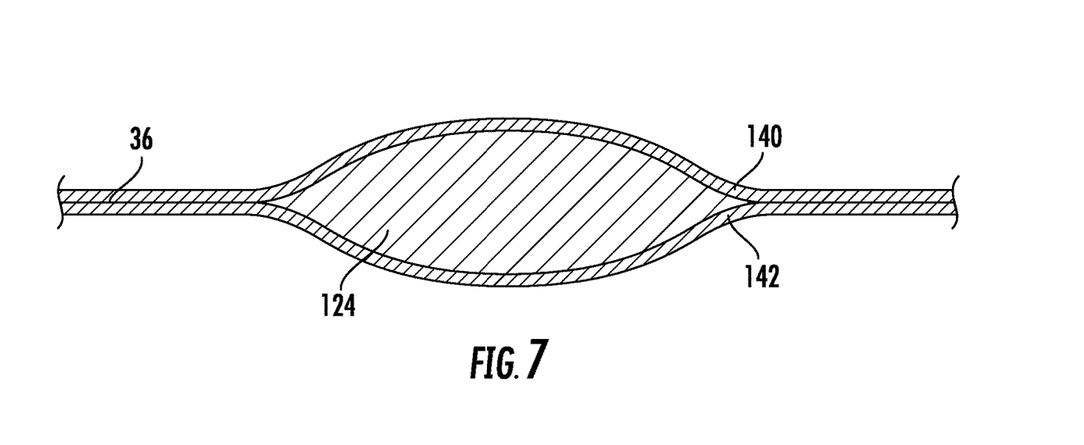
FIG. 7 is cross-section of the absorbent article of FIG. 6 taken along line 6-6.

The chassis region comprised of front, back and core regions generally has a composite structure comprising a liquid permeable topsheet and a liquid impermeable backsheet that are attached to each other along opposing surfaces to define a cavity therebetween in which the absorbent core is disposed. In this regard, FIG. 7 shows a cross-section of the diaper taken along line 7-7 of FIG. 6 showing the absorbent core 124 sandwiched between the topsheet 140 and backsheet 142.

Topsheet

The topsheet 140 is positioned adjacent an outer surface of the absorbent core 124 and is preferably joined thereto and to the backsheet 142 by attachment means (not shown) such as those well known in the art. For example, the topsheet 140 may be secured to the absorbent core 124 by a uniform continuous layer of adhesive, a patterned layer of adhesive, or an array of separate lines, spirals, or spots of adhesive In the context of joining diaper elements, the term "joined" encompasses configurations whereby an element is directly secured to the other element by affixing the element directly to the other element, and configurations whereby the element is indirectly secured to the other element by affixing the element to intermediate member(s) which in turn are affixed to the other element. In a preferred embodiment of the present invention, the topsheet 140 and the backsheet 142 are joined directly to each other in the diaper periphery 144 and are indirectly joined together by directly joining them to the absorbent core 124 by the attachment means (not shown).

Advantageously, the topsheet 140 comprises the composite sheet material (see FIGS. 1 and 2, reference characters 10, 10'). In this regard, the composite sheet material provides a topsheet that is compliant, soft feeling, and non-irritating to the wearer's skin. Further, the topsheet 140 is liquid pervious permitting liquids (e.g., urine) to readily penetrate through its thickness. In particular, in embodiments in which the composite comprises a two-layer structure, the carded fiber layer comprising natural fibers is advantageously oriented to towards the interior of the diaper. In other words, the carded fiber layer is oriented facing the skin of the wearer.

In some embodiments, the topsheet 140 is made of a hydrophobic material to help isolate the wearer's skin from liquids contained in the absorbent core 124. Generally, in embodiments in which the composite sheet material is used to form the topsheet, the composite sheet material has a basis weight from about 10 to 17 gsm.

In some embodiments, the topsheet may be treated with a surfactant to help ensure proper liquid transport through the topsheet and into the absorbent core. An example of a suitable surfactant is available from Momentive Performance Materials under the tradename NUWET™ 237.

Backsheet

The backsheet 142 is positioned adjacent to an opposite surface of the absorbent core 124 and is preferably joined thereto by attachment mechanisms (not shown) such as those well known in the art. Suitable attachment mechanisms are described with respect to joining the topsheet 140 to the absorbent core 124. Alternatively, the attachment means may comprise heat bonds, pressure bonds, ultrasonic bonds, dynamic mechanical bonds, or any other suitable attachment means or combinations of these attachment mechanisms as are known in the art.

The backsheet 142 is impervious to liquids (e.g., urine) and is preferably manufactured from a thin plastic film, although other flexible liquid impervious materials may also be used, that is joined to the composite sheet material. As used herein, the term "flexible" refers to materials which are compliant and will readily conform to the general shape and contours of the human body. The backsheet 142 prevents the exudates absorbed and contained in the absorbent core 124 from wetting articles which contact the diaper 120 such as bedsheets and undergarments. The backsheet 142 preferably comprises the composite sheet material, or a composite material such as a combination of an impervious film and the composite sheet material. In some embodiments, the backsheet may have a thickness of from about 0.012 mm (0.5 mil) to about 0.051 mm (2.0 mils).

Figure 8:
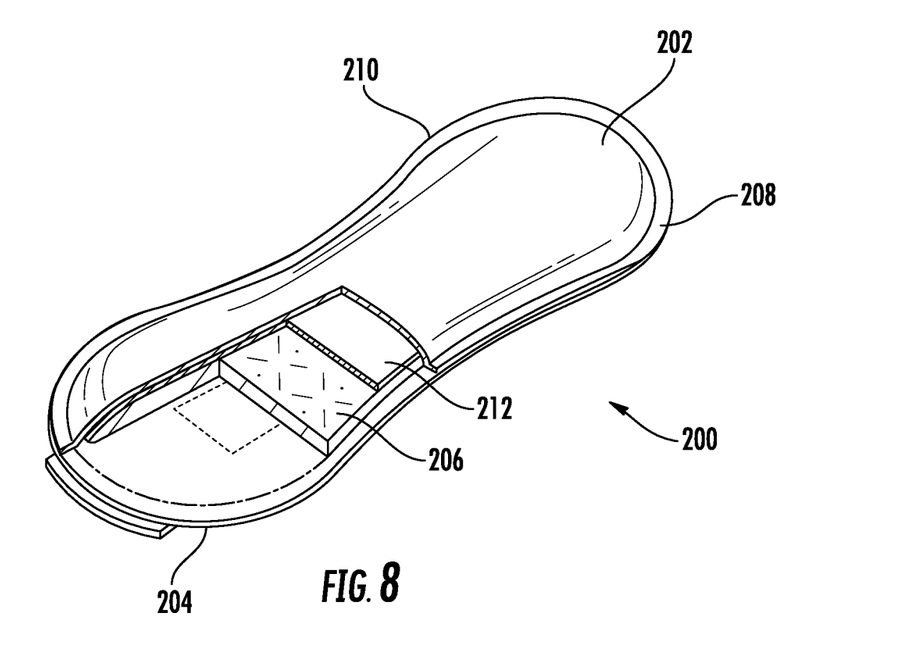
FIG. 8 is an illustration of an absorbent article in accordance with at least one embodiment of the present invention in which the absorbent article is in the form of a feminine sanitary pad.

With reference to FIG. 8, a further embodiment of an absorbent article in accordance with an embodiment of the present invention is illustrated in which the absorbent article is in the form of a feminine sanitary pad, broadly designated by reference character 200.

Pad 200 may include a topsheet 202, backsheet 204, and an absorbent core 206 disposed there between. Preferably, topsheet 202 and backsheet 204 are joined to each other about along opposing outer edges to define a continuous seam 208 that extends about the periphery 210 of the pad 200. Continuous seam 208 may comprise a heat seal that is formed from thermally bonding the topsheet and backsheet to each other. In other embodiments, continuous seam 208 is formed by adhesively bonding the topsheet and backsheet to each other.

As in the embodiments discussed above, one or more of the topsheet and backsheet 202, 208 may comprise a composite sheet in accordance with one or more embodiments of the invention.

In some embodiments, pad 200 may also include a fluid acquisition layer 212 that is disposed between the absorbent core 206 and the topsheet 202. Suitable materials for the fluid acquisition layer 212 are discussed previously.

EXAMPLES

The following examples are provided for illustrating one or more embodiments of the present invention and should not be construed as limiting the invention.

The following materials were used in the examples.

"SB" refers to a spunbond fabric comprising continuous polypropylene filaments. The fabric had a basis weight of 10 gsm and was bonded lightly (i.e., low temperature and pressure) with a thermal calender roll having a bond area of approximately 10 percent.

"SB-BICO" refers to a spunbond fabric comprised of continuous bicomponent filaments with a sheath comprised of polyethylene and a core comprised of polypropylene in a 50/50 ratio. The fabric had a basis weight of 28 gsm and was bonded lightly (i.e., low temperature and pressure) with a thermal calender roll having a bond area of approximately 10 percent.

"CFL" refers to a carded fabric layer comprised of cotton staple fibers. The cotton stable fibers were unbleached and had an average length of 25 mm. The fibers were provided by TJ Beall Company under the product name TRUECOTTON®.

"RB" refers to resin bonded fabric. The RB fabric has a basis weight of 43 gsm, and was a 50:50 blend of two different staple fibers: 6 denier polyethylene terephthalate (PET) and 9 denier PET. The fibers were bonded with styrene butadiene rubber (SBR) resin.

In the following examples, composite sheet materials in accordance with the invention were prepared using the following procedures. A previously prepared fabric (e.g. SB, SB-BICO, or RB) was provided on a roll. The fabric was unwound and deposited onto a collection surface and then advanced towards a Hollingsworth Carding Machine having a 1 meter width. The carding machine was modified by replacing the doffer with an air manifold as described above and depicted in FIGS. 4 and 5. Cotton staple fibers having a length of 25 mm were introduced onto the main cylinder of the carding machine. The cotton fibers were provided by TJ Beall Company under the product name TRUECOTTON®. A stream of air was introduced into the air manifold and then impinged against the surface of the cylinder to discharge the fibers from the cylinder. The cotton staple fibers were deposited onto the surface of the spunbond layer as a uniform carded fabric layer having an average basis weight of 7 gsm.

The composite sheet material was then hydroentangled with a Fleissner hydroentangling unit and dryer (1-meter width). The hydroentangling unit included one pre-wetting jet and two high pressure water jets. Following hydroentanglement, the composite sheet material was passed through an oven at temperatures ranging from 105 to 125° C. The process conditions for hydroentanglement and drying are provided in Table 1, below.

In Samples 7-9 and 14-15, an additional SB fabric layer was provided on a roll, and then deposited overlying the carded fabric layer.

TABLE 1

Hydroentanglement Process Conditions

| Sample No. | Sheet Structure | Pre-wetting pump pressure (bar) | Entaglement Water Pressure (bar) | Line Speed (m/min) | Jet Strip Orifice Diameter (mm) | Oven Temperature (° C.) | Drum Type | Carded Fiber Layer Position[1] |
|---|---|---|---|---|---|---|---|---|
| 1 | SB/CFL | 30 | 80 | 5 | 0.14 | 125 | Aperture | Up |
| 2 | SB/CFL | 30 | 60 | 5 | 0.14 | 125 | Aperture | Down |
| 3 | SB/CFL | 30 | 60 | 5 | 0.14 | 125 | Aperture | Down |
| 4 | SB-BICO/CFL | 30 | 80 | 5 | 0.14 | 105 | Aperture | Down |
| 5 | SB-BICO /CFL | 30 | 80 | 5 | 0.14 | 105 | Aperture | Down |
| 6 | SB-BICO /CFL | 30 | 95 | 5 | 0.14 | 105 | Aperture | Down |
| 7 | SB/CFL/SB | 30 | 60 | 5 | 0.14 | 125 | Aperture | Middle |
| 8 | RB/CFL/SB | 30 | 95 | 5 | 0.14 | 125 | Aperture | Middle |
| 9 | RB/CFL/SB | 30 | 80 | 5 | 0.14 | 125 | Aperture | Middle |
| 10 | SB/CFL | 30 | 60 | 5 | 0.14 | 105 | Flat | Down |
| 11 | SB/CFL | 30 | 45 | 5 | 0.14 | 105 | Flat | Down |
| 12 | SB/CFL | 30 | 45 | 5 | 0.14 | 105 | Flat | Down |
| 13 | SB/CFL | 30 | 95 | 5 | 0.14 | 105 | Flat | Down |
| 14 | SB/CFL/SB | 30 | 60 | 5 | 0.14 | 105 | Flat | Middle |
| 15 | RB/CFL/SB | 30 | 95 | 5 | 0.14 | 105 | Flat | Middle |

[1]Relative to the high pressure water jets.

SUMMARY OF THE CLAIMS

1. A system for preparing a composite sheet material, the system comprising:
   a nonwoven fabric source;
   a collection surface onto which a nonwoven fabric is deposited;
   a carding device disposed downstream of the nonwoven fabric source overlying the collection surface, the carding device including a main cylinder,
   an air source configured to provide a stream of air;
   an air manifold having an air inlet in communication with the air source, an air outlet, a fiber inlet, an interior channel, and a fiber outlet, wherein the air outlet is positioned and arranged to direct an air stream against a surface the cylinder such that fibers disposed on a surface of the cylinder are dislodged and collected into the air stream, the collected fibers then flow into the fiber inlet and through the interior channel to the fiber outlet at which point the fibers are deposited onto a surface of the nonwoven fabric; and a bonding unit disposed downstream of the carding device.

2. The system of claim 1, wherein the nonwoven fabric source comprises a spunbond beam disposed overlying the collection surface.

3. The system of claim 2, wherein the spunbond beam is configured to produce monocomponent or multicomponent filaments.

4. The system of claim 1, further comprising a second spunbond beam disposed downstream of the carding device.

5. The system of claim 4, wherein the second spunbond beam is configured to produce monocomponent or multicomponent filaments.

6. The system of any one or more of the preceding claims, wherein the bonding unit comprises a hydraulic entanglement unit.

7. The system of claim 6, further comprising a drying oven disposed downstream of the hydraulic entanglement unit.

8. The system of any one or more of claims 1-5, wherein the bonding unit comprises an air through bonder.

9. The system of claim 1, wherein the air manifold includes an air plenum disposed between the air inlet and the air outlet, the plenum having an expanding width from the air inlet to the air outlet.

10. The system of claim 9, wherein the air outlet and fiber inlet comprise a single continuous channel.

11. The system of any one or more of the preceding claims, wherein a width of the fiber outlet approximates the width of the nonwoven fabric.

12. The system of any one or more of the preceding claims, further comprising one or more vacuum sources disposed below the collection surface.

13. The system of any one or more of the preceding claims, wherein a line speed of the system is from 600 to 1,200 m/min., and in particular, from 800 to 1,200 m/min.

14. A method of preparing a composite sheet material, the method comprising:
depositing a nonwoven fabric layer onto a collection surface;
introducing a plurality of staple fibers into a carding device, wherein the staple fibers are oriented on a surface of a main cylinder of the carding device;
directing an air stream against the surface of the main cylinder via an air manifold to dislodge the fibers from the surface;
collecting the dislodged fibers into a fiber inlet of the air manifold;
discharging the dislodged fibers from a fiber outlet onto a surface of the nonwoven fabric to form a carded fabric layer; and
bonding the nonwoven and carded fabric layers to form a composite sheet material.

15. The method of claim 14, wherein the step of depositing a nonwoven fabric layer comprises extruding a plurality of continuous filaments from a spin beam to form the nonwoven fabric layer.

16. The method of claim 14 or 15, further comprising a step of depositing a second nonwoven fabric layer overlying the carded fabric layer.

17. The method of any one or more of claims 14 to 16, wherein the step of bonding comprises air through bonding.

18. The method of any one or more of claims 14 to 16, wherein the step of bonding comprises subjecting the composite sheet material to a plurality of fluid jets.

19. The method of any one or more of claims 14 to 18, wherein the nonwoven fabric is a spunbond or resin bonded nonwoven fabric.

20. The method of any one or more of claims 14 to 19, wherein the nonwoven fabric comprises a spunbond fabric having monocomponent or multicomponent filaments.

21. The method of any one or more of claims 14 to 20, wherein the composite sheet material has a basis weight of 7 to 60 gsm.

22. The method of any one or more of claims 14 to 20, wherein the staple fibers comprise natural fibers.

23. The method of any one or more of claims 14 to 20, wherein the staple fibers comprise cotton fibers.

24. The method of any one or more of claims 14 to 20, wherein the nonwoven fabric and the carded fabric layer are deposited at a line speed from 600 to 1,200 m/min.

25. A composite sheet material prepared according to the method of any one or more of claims 14 to 24.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for preparing a composite sheet material, the system comprising:
a nonwoven fabric source;
a collection surface onto which a nonwoven fabric is deposited;
a carding device disposed downstream of the nonwoven fabric source overlying the collection surface, the carding device including a main cylinder, and an air source configured to provide a stream of air;
a source of natural staple fibers;
an air manifold having an air inlet in communication with the air source, an air outlet, a fiber inlet in communication with the source of natural staple fibers, an interior channel, and a fiber outlet, wherein the air outlet is positioned and arranged to direct an air stream against a surface of the cylinder such that fibers disposed on a surface of the cylinder are dislodged and collected into the air stream, the collected fibers then flow into the fiber inlet and through the interior channel to the fiber outlet at which point the fibers are deposited onto a surface of the nonwoven fabric; and
a bonding unit disposed downstream of the carding device.

2. The system of claim 1, wherein the nonwoven fabric source comprises a spunbond beam disposed overlying the collection surface.

3. The system of claim 2, wherein the spunbond beam is configured to produce monocomponent or multicomponent filaments.

4. The system of claim 1, further comprising a second spunbond beam disposed downstream of the carding device.

5. The system of claim 4, wherein the second spunbond beam is configured to produce monocomponent or multicomponent filaments.

6. The system of claim 1, wherein the bonding unit comprises a hydraulic entanglement unit.

7. The system of claim 6, further comprising a drying oven disposed downstream of the hydraulic entanglement unit.

8. The system of claim 1, wherein the bonding unit comprises an air through bonder.

9. The system of claim 1, wherein the air manifold includes an air plenum disposed between the air inlet and the air outlet, the plenum having an expanding width from the air inlet to the air outlet.

10. The system of claim 9, wherein the air outlet and fiber inlet comprise a single continuous channel.

11. The system of claim 1, wherein fiber outlet is positioned from about 2 to 5 cm above the surface of the collection surface.

12. The system of claim 1, wherein the air manifold includes one or more curves or bends disposed between the fiber inlet and the fiber outlet.

13. The system of claim 12, wherein the series or curves define an s-like shape.

14. The system of claim 1, further comprising one or more vacuum sources disposed below the collection surface.

15. A system for preparing a composite sheet material, the system
comprising:
a nonwoven fabric source;
a collection surface onto which a nonwoven fabric is deposited;
a carding device disposed downstream of the nonwoven fabric source overlying the collection surface, the carding device including a main cylinder, and an air source configured to provide a stream of air;
an air manifold having an air inlet in communication with the air source, an air outlet, a fiber inlet, an interior channel, and a fiber outlet, wherein the air outlet is positioned and arranged to direct an air stream against a surface of the cylinder such that fibers disposed on a surface of the cylinder are dislodged and collected into the air stream, the collected fibers then flow into the fiber inlet and through the interior channel to the fiber outlet at which point the fibers are deposited onto a surface of the nonwoven fabric, wherein the air manifold includes one or more curves or bends disposed between the fiber inlet and the fiber outlet; and
a bonding unit disposed downstream of the carding device.

* * * * *